United States Patent [19]

Auchter

[11] Patent Number: 4,677,752
[45] Date of Patent: Jul. 7, 1987

[54] MANUAL MEASURING TOOL FOR ROLLS OF MATERIAL

[76] Inventor: Matthias J. Auchter, Morlauterer Strasse 11, 6750 Kaiserslautern, Fed. Rep. of Germany

[21] Appl. No.: 852,992

[22] Filed: Apr. 17, 1986

[51] Int. Cl.⁴ ............................................. G01B 3/02
[52] U.S. Cl. ..................................................... 33/128
[58] Field of Search ................. 33/128, 129, 139, 140, 33/138, 127

[56] References Cited

U.S. PATENT DOCUMENTS

| | | | |
|---|---|---|---|
| 78,399 | 5/1868 | Shotwell | 33/139 |
| 293,914 | 2/1884 | Sampson | 33/139 |
| 375,026 | 12/1887 | Tuxbury | 33/139 |
| 2,637,112 | 5/1953 | Fontaine et al. | 33/129 |
| 3,170,240 | 2/1965 | Collins | 33/140 |
| 3,785,055 | 1/1974 | Anderson et al. | 33/128 |

FOREIGN PATENT DOCUMENTS 1471650  4/1977  United Kingdom ................. 33/128

*Primary Examiner*—Harry N. Haroian
*Attorney, Agent, or Firm*—McGlew and Tuttle

[57] ABSTRACT

A tool for measuring rolled-up material comprises a housing with a measuring thread spool rotatably mounted in the housing, having a supply of measuring thread thereon, which is delivered out of the housing through a rotatable delivery tube which is angled to one side so that the tip of the tube may be passed around the material to be measured after the measuring material is anchored to the end of the material being measured. The measuring thread is advantageously passed over the thread spool which may be cylindrical and of uniform diameter or may vary in diameter from one side to the other. The thread spool is part of a counter which records the length of measuring thread that is fed out, preferably in feet and inches when the thread spool is made in the form of a cone measuring thread is guided on each side of the spool so that it passes over selective thicknesses of the spool and, thus, the feed-out speed is varied and so is the counting in dependence on how the thread is guided over the spool.

5 Claims, 3 Drawing Figures

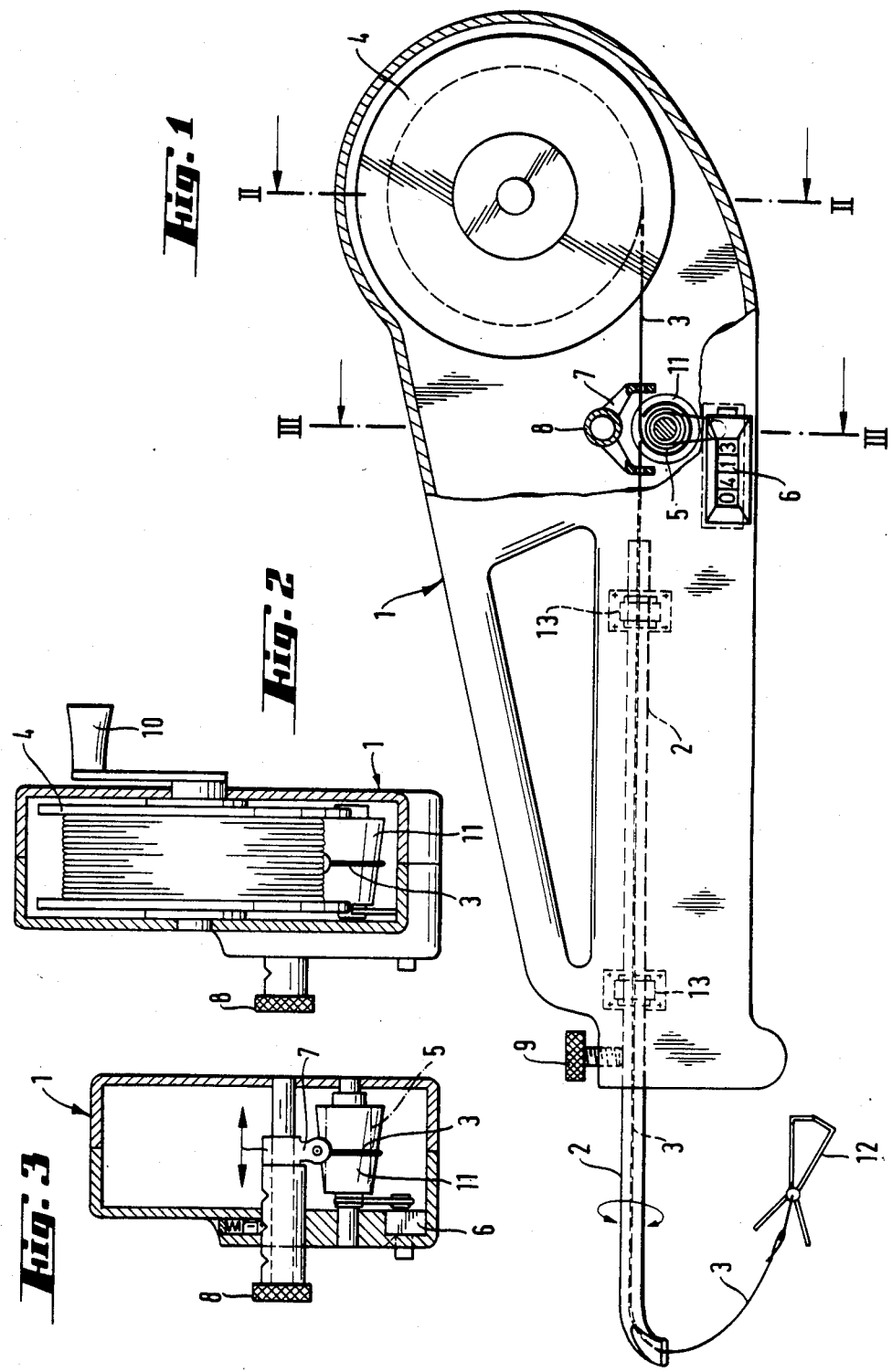

MANUAL MEASURING TOOL FOR ROLLS OF MATERIAL

BACKGROUND OF THE INVENTION

Field of the Invention

This invention relates, in general, to measuring devices and, in particular. to a new and useful measuring tool in which a measuring thread may be passed around the coils of a wound-up piece of material to record the length of the material.

The invention refers to a manual measuring tool for the measurement of lengths of materials rolled up in breadth, especially of carpet rolls or the like.

Materials, which are delivered as merchandise rolled up in breadth usually do not show how many feet of the rolled up merchandise are on such a roll. This applies in particular to those materials which are cut off from the roll—e.g. wall-to-wall carpeting, carpets, and the like. This former procedure required unrolling the merchandise, to measure it and rolling it up again. This procedure was very complicated and time-consuming, especially when considering the weight of wall-to-wall carpeting.

Measuring methods to determine the diameter of rolled up merchandise and the figures derived from this calculation in order to determine the length are so inexact, that the incorrect results lead to considerable waste.

SUMMARY OF THE INVENTION

The invention provides an instrument that enables the user to take an exact measurement of length of rolled up merchandise by means of a manual measuring tool without moving the rolled up merchandise itself. The instrument is ready for use at any time. at any place and in any position of the rolled up merchandise.

A measuring tool comprises a housing having a tube pivoted therein. A thread is led from a spool and passes over a cylinder which is connected with a counter and out of the tube. The cylinder is usefully designed as a cone and the thread passes over this cone and it is shaped so that it is adjustable lengthways over the cone by means of a thread guide making it possible to assign different diameters of the thread pass to the counter. This construction makes it possible to adjust the counter speed depending on the thickness of the rolled-up merchandise, which is to be measured so that the instrument exactly shows the length of the merchandise.

The advantage of such an instrument is its handiness and in particular its fast applicability. The measurement of rolled up merchandise can be taken very fast. It only takes one or two minutes to measure a thick roll.

Accordingly, it is an object of the invention to provide an improved device for measuring the length of materials when it is in a rolled-up condition.

A further object of the invention is to provide a measuring tool which includes a measuring thread which is passed through a rotatable delivery tube which may be positioned so that it revolves as the thread is wound around successive coils of the material.

A further object of the invention is to provide a measuring tool which includes means for measuring the length of a measuring thread which is fed which may effect a varying measurement indication or thread speed feed.

A further object of the invention is to provide a measuring tool which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

In the Drawings:

FIG. 1 is a partial elevational view and longitudinal sectional view of a measuring tool constructed in accordance with the invention;

FIG. 2 is a section taken along the line II—II of FIG. 1; and

FIG. 3 is a section taken along the line III—III of FIG. 1.

GENERAL DESCRIPTION OF THE PREFERRED EMBODIMENTS

Referring to the drawings, in particular, the invention embodied therein comprises a tool for measuring rolled-up material such as carpet, and which comprises a housing generally designated 1 with a measuring thread spool 4 rotatably mounted within the housing at one end thereof and oriented to deliver the measuring thread 3 through a tube 2 which is rotatably mounted within the housing on space bearings 13,13. One end of the delivery tube 2 is aligned with the spool and the opposite end is angled so that the measuring thread 3 is delivered outwardly at an angle and the tube is rotated. Advantageously, the end of the tube 2 is flattened to permit the insertion of the tube between the coils of a wound-up piece of material and to permit its movement around from one end of the material to the other as an end having a fastener 12 which is secured to one end of the material.

In accordance with a feature of the invention, a counter 6 is mounted in the housingand it includes as part of its counting mechanism a rotatable spool which may comprise a cylindrical spool 5 or a tapered spool 11. When a tapered spool 11 is employed, the measuring thread 3 is guided through guide elements 7,7 carried on a rocker 8 which may be shifted laterally to position the measuring thread 3 at locations along the circumference of the measuring spool 11. Variations of the position of the coil of thread 3 around the spool 11 will effect variations of the feed of this measuring thread as well as variations of the recorded delivery of the measuring thread out of the housing 1.

The instrument (1) has a handy form and in its inside it shelters a tube (2) that is rotatably mounted in bearing (13). The tube (2) stands out of the housing a little. The thread (3) is lead through the tube (2) from a spool (4) and past a counter (6) in the inside of the housing (1). The counter (6) includes a spool (5) and a thread guide (7).

The spool (4) is a commercial spool, which makes it possible to wind up the thread very easily. When unwinding the thread, the spool 4 has a slight resistance in its unwinding mechanism, so the thead is always tightened. The unwinding resistance can be either adjustable or rigid. The thread is wound by means of a handle (10).

The counter 6 is located in the housing so that it can easily be read through the appropriate recess in the housing. If the counter (6) is fitted with a spool (5), the thread guide (7) will be unnecessary and the thread is wound around the spool of thread (5) only once. In order to take into consideration the different thickness of merchandise, spools of a thread with different diameters, which are easy to exchange, are provided.

However, the adjustment to different materials and thickness can be achieved more easily by inserting a cone (11) instead of the spool (5). The cone (11) is adjusted between its smallest and largest diameter to the minimum and maximum conditions of the merchandise to measure. A thread guide (7) fitted with two eyelets to lead the thread through is provided over the cone. It is possible to set different diameters by adjusting this thead guide over the working surface of the cone (11). This construction guarantees the adjustment to different types of merchandise. The counter can always be optimally set in a table by an adjustment scale that can be scanned by means of an adjusting screw (8).

When measuring rolled-up merchandise e.g. wall-to-wall carpeting, a clip (12) that is positioned at the end of the thread (3) is clamped at the corner of the merchandise's cut surface. The counter (6) has to be set at zero and the manual measuring tool is moved around the outside of the rolled up merchandise. Then tube (2) of the manual measuring tool is introduced with its free end between the two outside layers of the rolled-up merchandise so that the manual measuring tool stands out at the side of the roll, i.e. axially of the roll. Now, the manual measuring tool is moved in a circle through the individual layers until the last inside end of the roll is reached.

These motions can be easily performed since the tube (2) is rotatably mounted within the manual measuring tool; therefore, it can go along the individual windings.

The counter is preferably calibrated in feet and inches and shows the length of the unrolled thread. To take into consideration the different thickness of rolled up materials it is necessary to fit the spool (5) with different diameters, respectively, to introduce a cone (11) instead of a spool 5 into the counter in order to work with adjusted diameters over the cone length. Also, when using the cone (11) the thread passes around the cone and is lead in the thread guide (7) that determines the position of the diameter on the cone.

It will be useful to indicate in a table for different thicknesses of material which position the thread guide should take. In addition, it will be useful to flatten the outer end of the tube (2) at one side so that it permits a perfect thread pass. This flattened end can be moved more easily through rolled-up materials of a relatively thin thickness.

In particular, the instrument is advantageous when measuring rolled-up materials where pieces had been cut off, since the manual measuring tool makes it possible to determine relatively fast the remaining material rolled up on the roll and, especially to find out if it is still sufficient as wall-to-wall carpeting for the planned cuts. In order to prevent that after the measuring procedure, the length of the unrolled thread is changed by unintended movements of the tool, a lock screw (9) is provided to hold the tube tight in a fixed position.

While a specific embodiment of the invention has been shown and described in detail to illustrate the application of the principles of the invention, it will be understood that the invention may be embodied otherwise without departing from such principles.

I claim:

1. A tool for measuring rolls of material comprising a housing and measuring thread spool rotatably mounted in said housing having a supply of measuring thread thereon, a delivery tube rotatably mounted in said housing and having one end aligned with said spool and an opposite end extending out of said housing, said measuring thread extending from said spool through said tube at one end and through said tube and out of said tube opposite end, said measuring thread having means at its outer end for engagement thereof of the material to be measured, a counter having a spool means rotatably mounted in said housing adjacent said spool means, said measuring thread having a turn extending around said spool means so that said spool means is rotated during payout of said measuring thread, said spool means having a cylindrical surface over which the thread is engaged which varies in diameter along its length and means associated with said spool means for positioning the measuring thread so as to engage around the selected portion of the circumference of said pool means.

2. A tool according to claim 1, including indicator means connected to said spool means for measuring the rotation of said spool means and the payout of said measuring thread.

3. A tool according to claim 1 wherein said tube portion extending out of said housing has an outer flat end extending at an angle from the major axis of said tube.

4. A tool according to claim 1, wherein said means associated with said spool means comprises the thread guide including an eyelet on each side of spool means through which the thread moves and means for shifting said thread guide with said eyelet laterally.

5. A tool according to claim 4, wherein said housing includes a widened portion at one end carrying said measuring thread spool and a narrow portion on its opposite end through which said rotatable tube extends, means on said housing for anchoring said tube against rotation, said housing includes a handle portion be tween said narrow end and said wide end.

* * * * *